United States Patent
Qian et al.

(10) Patent No.: US 11,048,212 B2
(45) Date of Patent: Jun. 29, 2021

(54) METHOD AND APPARATUS FOR PRESENTING WATCH FACE, AND SMARTWATCH

(71) Applicant: HUAWEI TECHNOLOGIES CO., LTD., Guangdong (CN)

(72) Inventors: Li Qian, Shenzhen (CN); Xueyan Huang, Shenzhen (CN); Kangmin Huang, Shenzhen (CN); Maosheng Huang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 434 days.

(21) Appl. No.: 16/016,433

(22) Filed: Jun. 22, 2018

(65) Prior Publication Data

US 2018/0299836 A1  Oct. 18, 2018

Related U.S. Application Data

(63) Continuation of application No. PCT/CN2017/111288, filed on Nov. 16, 2017.

(30) Foreign Application Priority Data

Dec. 22, 2016  (CN) .......................... 201611200092.3

(51) Int. Cl.
*G04G 9/00* (2006.01)
*G04B 45/00* (2006.01)
(Continued)

(52) U.S. Cl.
CPC ............. *G04G 9/007* (2013.01); *G04B 45/00* (2013.01); *G06F 3/147* (2013.01);
(Continued)

(58) Field of Classification Search
CPC ........ G04G 9/007; G04G 21/06; G04G 21/00; G04B 45/00; G06K 9/00684
See application file for complete search history.

(56) References Cited

U.S. PATENT DOCUMENTS 5,455,808 A * 10/1995 Grupp ..................... G04G 9/06
368/228
6,449,219 B1 * 9/2002 Hepp ....................... G04G 9/02
368/16
(Continued)

FOREIGN PATENT DOCUMENTS

CN  101807370 A   8/2010
CN  101924862 A  12/2010
(Continued)

OTHER PUBLICATIONS

How To Match A Watch With Your Outfit—realmenrealstyle.com/match-watch-to-outfit—2017.*
(Continued)

*Primary Examiner* — Sean Kayes
(74) *Attorney, Agent, or Firm* — Womble Bond Dickinson (US) LLP

(57) ABSTRACT

An embodiment of the present invention provides a method for presenting a watch face. The method includes: obtaining first context information and second context information, where the first context information is used to determine a watch face style of the smartwatch, and the second context information is used to indicate dressing information of a user; determining the watch face style of the smartwatch according to the first context information; and presenting a watch face pattern of the smartwatch according to the watch face style and the second context information.

20 Claims, 10 Drawing Sheets

(51) Int. Cl.
  *G06F 3/147*  (2006.01)
  *G06K 9/00*  (2006.01)
  *G04G 21/00*  (2010.01)
  *G04G 21/06*  (2010.01)

(52) U.S. Cl.
  CPC ......... *G06K 9/00684* (2013.01); *G04G 21/00* (2013.01); *G04G 21/06* (2013.01)

(56) References Cited

U.S. PATENT DOCUMENTS

| | | | | |
|---|---|---|---|---|
| 6,714,486 | B2* | 3/2004 | Biggs | G04G 9/00 368/10 |
| 6,819,632 | B1* | 11/2004 | Paul | G04B 45/0092 368/88 |
| 7,843,769 | B2* | 11/2010 | Ishida | G04G 9/02 368/82 |
| 8,693,291 | B2* | 4/2014 | Umamoto | G04G 21/02 368/82 |
| 9,785,123 | B2* | 10/2017 | Mansour | G04G 21/08 |
| 2005/0185517 | A1* | 8/2005 | Lazaretnik | G04B 37/0083 368/223 |
| 2011/0109538 | A1 | 5/2011 | Kerr et al. | |
| 2015/0055879 | A1 | 2/2015 | Yang | |
| 2016/0048296 | A1 | 2/2016 | Gan et al. | |
| 2016/0259491 | A1 | 9/2016 | Jacobs et al. | |
| 2016/0314497 | A1 | 10/2016 | Migicovsky et al. | |
| 2017/0013241 | A1 | 1/2017 | Qian et al. | |

FOREIGN PATENT DOCUMENTS

| | | |
|---|---|---|
| CN | 103608759 A | 2/2014 |
| CN | 103701904 A | 4/2014 |
| CN | 103942021 A | 7/2014 |
| CN | 104856290 A | 8/2015 |
| CN | 104880942 A | 9/2015 |
| CN | 105204636 A | 12/2015 |
| CN | 105357013 A | 2/2016 |
| CN | 205374997 U | 7/2016 |
| JP | 2010-243334 A | 10/2010 |
| JP | 2014-174144 A | 9/2014 |
| KR | 100819916 B1 | 4/2008 |

OTHER PUBLICATIONS

Personal Computer:"Smart Watch More Like a Watch Huawei Watch officially released in China",Dec. 2015. 1 page of English abstract.

XP058298807.Oskar Juhlin et al. Fashionable Services for Wearables—Inventing and Investigating a New Design Path for Smart Watches, NordiCHI 16, Oct. 23-27, 2016.10 pages.

* cited by examiner

Watch face styles and watch face patterns that are corresponding to usage occasions and dressing information

| Sequence number | Usage occasion | Watch face style | Dressing information | Watch face pattern example |
|---|---|---|---|---|
| 1 | At daily work | Business and simple | Suit, shirt, tie, and leather shoes | 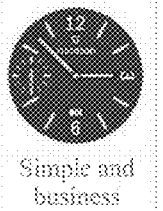 Simple and business |
| 2 | At daily work | Business and simple | T-shirt, jeans, and casual shoes | 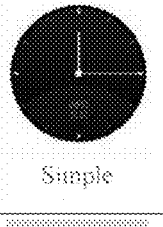 Simple |
| 3 | At daily work | Business and simple | Dress and silk stockings | 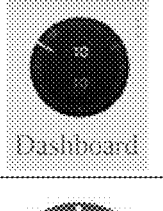 Dashboard |
| 4 | Business meeting | Business and simple | Suit, shirt, tie, and leather shoes | 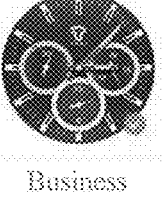 Business |

FIG. 11A

| Sequence number | Usage occasion | Watch face style | Dressing information | Watch face pattern example |
|---|---|---|---|---|
| 5 | Sports and fitness | Sport and fashion | Outdoor jacket, sport T-shirt, and sport shoes |  |
| 6 | Casual party | Casual, fashion, cartoon, and simple | Light-color T-shirt |  |
| 7 | Casual party | Casual, fashion, cartoon, and simple | Cartoon theme image T-shirt |  |

| Sequence number | Usage occasion | Watch face style | Dressing information | Watch face pattern example |
|---|---|---|---|---|
| 8 | Travel | Casual | T-shirt, casual pants, and casual shoes |  |
| 9 | Dating | Casual | T-shirt, jeans, and casual shoes |  |
| 10 | Dating | Casual, simple, exquisite, and elegant | Pure-color shirt and suit pants |  |

METHOD AND APPARATUS FOR PRESENTING WATCH FACE, AND SMARTWATCH

CROSS-REFERENCE TO RELATED APPLICATIONS

This application is a continuation of International Application No. PCT/CN2017/111288, filed on Nov. 16, 2017, which claims priority to Chinese Patent Application No. 201611200092.3, filed on Dec. 22, 2016, both of which are hereby incorporated by reference in their entireties.

TECHNICAL FIELD

The present invention relates to the field of electronic technologies, and in particular, to a method and an apparatus for presenting a watch face, and a smartwatch.

BACKGROUND

With the development of intelligent wearable products, smartwatches are increasingly popular and have gradually been used in consumers' daily life. Smartwatches of various styles emerge one after another, such as an iWatch mainly featured in a fashion style, a Huawei Watch mainly featured in a business style, or a Nike smartwatch mainly featured in a sport style. These smartwatches are corresponding to different working and living application scenarios confronted by a user. A watch face of a smartwatch is electronically displayed, and a watch face pattern can be changed at will; therefore, a smartwatch also provides a function that enables the user to manually change a watch face presenting form.

When buying a conventional watch, people usually need to pay attention to whether a style of the conventional watch is all-match, or buy several watches of different styles to prepare for different occasions. However, in this aspect, the smartwatch is much more convenient. An original program provided in the smartwatch or some third-party programs provide a large quantity of various watch faces that can be downloaded by the user. However, too many choices means that it is difficult to make a choice; therefore, instead, it takes the user too much time in selecting a watch face, or the user does not change a watch face pattern for a long time because of a hard choice. As a result, user experience is poor, and an advantage that a watch face of a smartwatch can be changed flexibly is not brought into full play.

SUMMARY

Embodiments of the present invention provide a method for presenting a watch face according to user feature information. According to the method, a watch face style can be determined according to first context information of a user, a watch face pattern can be determined according to the determined watch face style and second context information of the user, and then, the watch face pattern is presented, so that the watch face pattern is automatically changed according to a user feature. Therefore, a watch face pattern of a smartwatch worn in different scenarios can match a current scenario, and even if the user wears one smartwatch, the user can be present in different working and living scenarios at ease, with personal taste expressed.

According to a first aspect, an embodiment of the present invention provides a method for presenting a watch face. The method includes: detecting and/or receiving first context information and second context information, where the first context information is used to determine a watch face style of the smartwatch, and the second context information is used to indicate dressing information of a user; determining the watch face style of the smartwatch according to the first context information; and presenting a watch face pattern of the smartwatch according to the watch face style and the second context information.

According to the method for presenting a watch face provided in this embodiment of the present invention, first, the watch face style can be determined according to the first context information, and then, the watch face pattern is presented with reference to the watch face style and the second context information. In this way, a process of presenting the watch face pattern is optimized, a suitability degree between the watch face style, the watch face pattern, and a usage scenario is improved, and time and energy consumed for selecting the watch face pattern by the user are reduced.

In one embodiment, the first context information includes one or more of location information of the user, current time information, action information, agenda information, voice information, social media information, or operation instruction information of the user; and the determining the watch face style of the smartwatch according to the first context information includes: determining a usage occasion of the user according to the first context information; and determining the watch face style of the smartwatch according to the usage occasion.

In one embodiment, the presenting a watch face pattern of the smartwatch according to the watch face style and the second context information includes: presenting, according to a preset correspondence, a watch face pattern corresponding to the watch face style and the dressing information, where the preset correspondence is used to indicate that one combination of the watch face style and the dressing information corresponds to one watch face pattern.

In one embodiment, the dressing information includes one or more of upper clothes information, outer wear information, trousers information, shoes and hat information, scarf information, or accessory information.

In one embodiment, before the presenting, according to a preset correspondence, a watch face pattern corresponding to the watch face style and the dressing information, the method further includes: setting a priority level of the one or more of upper clothes information, outer wear information, trousers information, shoes and hat information, scarf information, or accessory information; and the presenting, according to a preset correspondence, a watch face pattern corresponding to the watch face style and the dressing information includes: presenting, according to the preset correspondence and a sequence of the priority level, the watch face pattern corresponding to the watch face style and the dressing information.

In one embodiment, the presenting a watch face pattern of the smartwatch according to the watch face style and the second context information includes: displaying, according to a preset correspondence, a watch face pattern corresponding to the watch face style and the dressing information to the user, for the user to select, where the preset correspondence is used to indicate that one combination of the watch face style and the dressing information corresponds to at least one watch face pattern; and presenting a watch face pattern selected by the user.

In one embodiment, before the detecting and/or receiving first context information and second context information, the method further includes: obtaining personal feature information of the user; and determining at least one watch face style of the smartwatch according to the personal feature information of the user.

In one embodiment, the determining the watch face style of the smartwatch according to the first context information includes: further determining, according to the first context information, the watch face style of the smartwatch from the at least one watch face style, of the smartwatch, determined according to the personal feature information.

According to a second aspect, an embodiment of the present invention provides a method for presenting a watch face. The method includes: detecting or receiving preference information of a user and a watch face pattern of at least one other user, where the preference information of the user is used to indicate whether the user likes to have a watch face pattern the same as the watch face pattern of the at least one other user, and the at least one other user includes one or more of a social media friend of the user, a social media object followed by the user, or a nearby user; and presenting one of the watch face pattern of the at least one other user according to the preference information of the user.

In one embodiment, the presenting one of the watch face pattern of the at least one other user according to the preference information of the user includes: displaying the watch face pattern of the at least one other user to the user according to the preference information of the user, for the user to select; and presenting a watch face pattern selected by the user.

According to a third aspect, an embodiment of the present invention provides an apparatus for presenting a watch face of a smartwatch. The apparatus includes: a detection unit and/or a receiving unit, configured to detect and/or receive first context information and second context information, where the first context information is used to determine a watch face style of the smartwatch, and the second context information is used to indicate dressing information of a user; a determining unit, configured to determine the watch face style of the smartwatch according to the first context information that is detected by the detection unit and/or received by the receiving unit; and a presenting unit, configured to present a watch face pattern of the smartwatch according to the watch face style, of the smartwatch, determined by the determining unit and the second context information that is detected by the detection unit and/or received by the receiving unit.

According to a fourth aspect, an embodiment of the present invention provides an apparatus for presenting a watch face of a smartwatch, including: a detection unit and/or a receiving unit, configured to detect or receive preference information of a user and a watch face pattern of at least one other user, where the preference information of the user is used to indicate whether the user likes to have a watch face pattern the same as the watch face pattern of the at least one other user, and the at least one other user includes one or more of a social media friend of the user, a social media object followed by the user, or a nearby user; and a presenting unit, configured to present one of the watch face pattern of the at least one other user according to the preference information of the user.

According to a fifth aspect, an embodiment of the present invention includes a smartwatch. The smartwatch includes the apparatus provided in the third aspect.

According to a sixth aspect, an embodiment of the present invention includes another smartwatch. The another smartwatch includes the apparatus provided in the fourth aspect.

According to a seventh aspect, an embodiment of the present invention includes a smartwatch. The smartwatch includes: an I/O system and/or a transceiver circuit, configured to detect and/or receive first context information and second context information, where the first context information is used to determine a watch face style of the smartwatch, and the second context information is used to indicate dressing information of a user; a processor and a display screen, where the processor is configured to determine the watch face style of the smartwatch according to the first context information that is detected by the I/O system and/or received by the transceiver circuit, and the display screen is configured to present a watch face pattern of the smartwatch according to the watch face style, of the smartwatch, determined by the processor and the second context information that is detected by the I/O system and/or received by the transceiver circuit.

According to an eighth aspect, an embodiment of the present invention includes a smartwatch. The a smartwatch includes: an I/O system and/or a transceiver circuit, configured to detect or receive preference information of a user and a watch face pattern of at least one other user, where the preference information of the user is used to indicate whether the user likes to have a watch face pattern the same as the watch face pattern of the at least one other user, and the at least one other user includes one or more of a social media friend of the user, a social media object followed by the user, or a nearby user; and a display screen, configured to present one of the watch face pattern of the at least one other user according to the preference information of the user.

According to a ninth aspect, an embodiment of the present invention includes a computer storage medium. An instruction is stored in the computer storage medium, and when the instruction is run on a computer, the computer can perform the method according to any one of the first aspect or embodiments of the first aspect.

According to a tenth aspect, an embodiment of the present invention includes a computer storage medium. An instruction is stored in the computer storage medium, and when the instruction is run on a computer, the computer can perform the method according to any one of the second aspect or embodiments of the second aspect.

According to the method and apparatus for presenting a watch face of a smartwatch, and the smartwatch that are provided in the embodiments of the present invention, the first context information and the second context information can be detected and/or received, the watch face style can be determined according to the first context information, and then, the watch face pattern is presented with reference to the second context information. In this way, a process of automatically presenting the watch face pattern is optimized, a suitability degree between the watch face style, the watch face pattern, and a usage scenario is improved, and time and energy consumed for selecting the watch face pattern by the user are reduced.

BRIEF DESCRIPTION OF DRAWINGS

FIGS. 11A-11C are block diagrams illustrating certain data structures storing correspondence between watch styles and patterns usage occasions and dressing information.

DESCRIPTION OF EMBODIMENTS

A user needs to change a watch face of a smartwatch in different scenarios. Although a prior-art smartwatch provides a large quantity of watch faces of various styles and patterns for the user to select, it takes the user much time to select a suitable watch face, and it is relatively difficult for a user to select a watch face that is suitable for a current scenario because the user may lack of related knowledge about how to match a watch face. Embodiments of the present invention provide a method for presenting a watch face of a smartwatch, and an apparatus and a smartwatch that are based on the method. A watch face that is suitable for a current scenario can be automatically presented according to current user feature information, or one or more watch face patterns are recommended to the user, for the user to select, so that time consumed for selecting a watch face by the user is reduced and a suitability degree between a watch face and a current scenario is improved.

In one embodiment, a method for presenting a watch face provided in the present invention includes: obtaining context information in a process of using a smartwatch by the user, where the context information includes first context information and second context information, the first context information may be used to determine a watch face style, and the second context information may be used to indicate dressing information of the user; then, determining the watch face style according to the first context information; and presenting a watch face pattern according to the watch face style and the second context information. In one embodiment, according to the method for presenting a watch face provided in the present invention, a watch face pattern recently used by another user that is followed by the user can also be recognized through social networking, a watch face pattern used by a nearby user can be recognized based on a geographic location, and a watch face pattern of the other user is presented according to preference of the user.

It should be noted that, the watch face pattern related to the embodiments of the present invention may include a specific image of a watch face background, specific shapes and colors of watch hands and numbers, and a shape and a color of another graphic element, such as an icon, on a watch face; and the watch face pattern may be one specific watch face presenting pattern of a watch. The watch face style related to the embodiments of the present invention may be a type of a watch face pattern. Watch face patterns that correspond or belong to a same watch face style may be watch face patterns with a same or similar feature, or may be watch face patterns presenting a typical look as a whole. The method provided in the embodiments of the present invention is described in the following. The method may be performed by the smartwatch.

Figure 1:
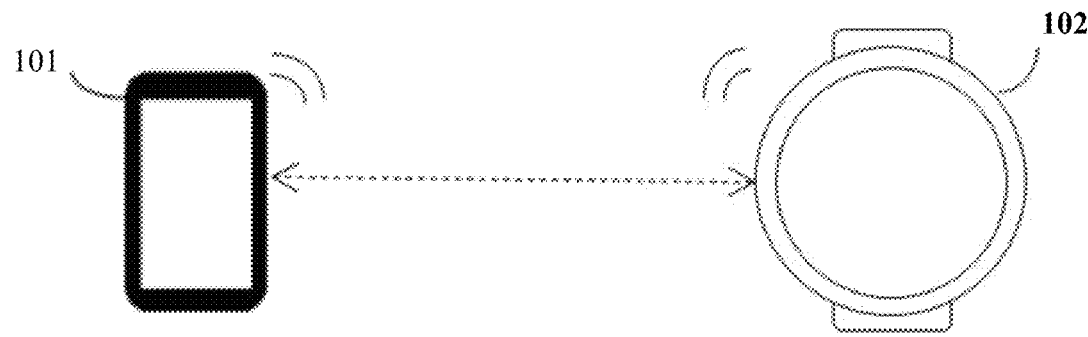
FIG. 1 is a diagram of a system framework of a method for presenting a watch face of a smartwatch according to an embodiment of the present invention.

An application framework of a method for presenting a watch face of a smartwatch according to an embodiment of the present invention is shown in FIG. 1. A smartwatch 102 may be connected to an intelligent terminal 101 in a communication manner such as Wi-Fi or Bluetooth. The smartwatch 102 may detect first context information and second context information, or receive first context information and second context information detected by the intelligent terminal 101. The intelligent terminal 101 may include various intelligent terminals that are carried by a user in daily life for communication and work, such as a smartphone, a tablet computer, and a personal digital assistant (PDA). The smartwatch 102 may perform processing according to the first context information and the second context information that are detected or received, so as to obtain a watch face pattern that matches a scenario in which the user wears the watch. The smartwatch 102 may alternatively process the first context information and the second context information using a computing capability of the intelligent terminal 101, so as to obtain a watch face pattern that matches a scenario in which the user uses the watch.

Figure 2:
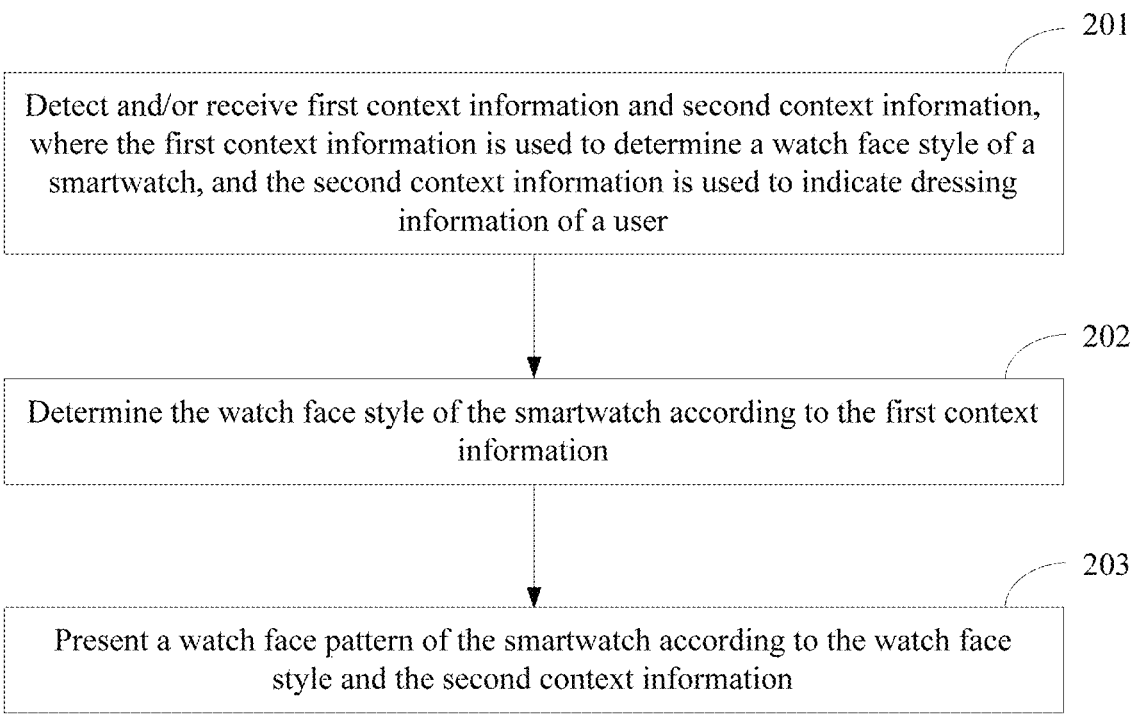
FIG. 2 is a flowchart of a method for presenting a watch face of a smartwatch according to an embodiment of the present invention.

An embodiment of the present invention provides a method for presenting a watch face of a smartwatch, and the method is performed by a smartwatch. As shown in FIG. 2, the method includes the following operations.

Operation 201. Detect and/or receive first context information and second context information, where the first context information is used to determine a watch face style of the smartwatch, and the second context information is used to indicate dressing information of a user.

A smartwatch 102 may detect the first context information and the second context information using a hardware resource of the smartwatch 102, or receive the first context information and the second context information that are sent by an intelligent terminal 101. The first context information is used to determine the watch face style of the smartwatch, and the second context information is used to indicate the dressing information of the user.

In one embodiment, the second context information that is used to indicate the dressing information of the user may be detected using a camera of the smartwatch 102, or may be obtained by receiving second context information detected by a camera of the intelligent terminal 101. Specifically, a photo including a user's dressing status may be taken using the camera, and the dressing information of the user may be obtained from the photo.

In one embodiment, an operation interface of the intelligent terminal 101 or of the smartwatch 102 may include an option or input interface of the second context information, or the option or input interface may be provided using an application installed in the intelligent terminal 101 or the smartwatch 102. The intelligent terminal 101 or the smartwatch 102 may store a plurality of types of second context information, for the user to select through the option or input interface; or the user may manually input the second context information through the option or input interface. The selected or input second context information includes the dressing information of the user.

Operation 202. Determine the watch face style of the smartwatch according to the first context information.

In one embodiment, an occasion in which the user uses the smartwatch may be determined according to the first context information.

In one embodiment, the first context information may include current time information, location information, and action information that are of the user. A current location of the user may be obtained using a positioning system of the smartwatch 102 or a positioning system of the intelligent terminal 101, the action information of the user may be obtained using a sensor system of the smartwatch 102 or a sensor system of the intelligent terminal 101, and the occasion in which the user uses the smartwatch is recognized according to the current time information, the location, and the action information. For example, if the time is 6:00 a.m., the user is outdoors, and the action is running, it can be recognized, according to the current time information, the location information, and the action information, that the user is doing sports and fitness using the smartwatch 102. That is, in this example, the sports and fitness occasion, in which the user uses the smartwatch 102, is determined according to the first context information that includes the current time information, the location information, and the action information.

In one embodiment, the first context information may further include agenda information of the user. For example, the agenda information may be obtained from an agenda application installed in the smartwatch 102 or the intelligent terminal 101. For example, if it is obtained, from the agenda application, that the user is attending a meeting, the occasion in which the user uses the smartwatch 102 may be determined as meeting.

In one embodiment, the first context information may further include social media information. Specifically, social media information posted by the user may be obtained from a social media application; and the occasion in which the user uses the smartwatch 102 may be determined according to the social media information.

In one embodiment, the first context information may further include voice information of the user. For example, voice "I am going to a friend's birthday party" of the user is obtained, and the occasion in which the user uses the smartwatch 102 may be determined as casual party according to the voice information.

Referring to the processing rule of the foregoing examples, Table 1 lists different types of first context information and usage occasions, in which the user uses the smartwatch 102, determined according to the first context information.

TABLE 1

First context information and usage occasion corresponding to the first context information

| Obtained first context information | Usage occasion |
| --- | --- |
| Time: 6:00 a.m.<br>Location: outdoors<br>User behavior: running | Sports and fitness |
| Location: a meeting room<br>An agenda app that is matched: attending a business negotiation at time XX | Business meeting |
| Voice information of the user: I am going to a friend's birthday party | Casual party |
| Location: a resort<br>Various beautiful on-vacation photos or videos | Travel |

TABLE 1-continued

First context information and usage occasion corresponding to the first context information

| Obtained first context information | Usage occasion |
| --- | --- |
| extracted from social media of the user | |
| Time: 9:00 a.m.<br>Location: company | At daily work |
| Time: 7:00 p.m.<br>Location: western restaurant XX | Dating |

In one embodiment, obtaining the first context information may further include: receiving operation instruction information of the user, and determining the watch face style according to the operation instruction information of the user. In an example, the user may manually select a usage occasion using a setting interface of the smartwatch 102 or a setting interface of an application, corresponding to the smartwatch 102, installed in the intelligent terminal 101. A usage occasion may be selected from a drop-down list including a plurality of options, or the like. Then, the usage occasion selected by the user is used as the usage occasion of the user, such as at daily work, business meeting, sports and fitness, casual party, travel, or dating.

In one embodiment, a watch face style that matches the usage occasion may be determined according to the foregoing usage occasion. The watch face style may include business, cartoon, sport, abstract, simple, fashion, rough, exquisite, noble, elegant, casual, or the like.

In one embodiment, the usage occasion and the watch face style that matches the usage occasion may be in a correspondence and stored in the smartwatch 102. An example of a correspondence is shown in Table 2.

TABLE 2

| Match between a usage occasion and a watch face style | |
| --- | --- |
| Usage occasion | Watch face style |
| At daily work | Business and simple |
| Business meeting | Business and simple |
| Sports and fitness | Sport and fashion |
| Casual party | Casual, fashion, cartoon, and simple |
| Travel | Casual |
| Dating | Casual, simple, exquisite, and elegant |

Operation 203. Present a watch face pattern of the smartwatch according to the watch face style and the second context information.

In this embodiment of the present invention, the watch face pattern is a final presenting form of the watch face, and one watch face pattern is corresponding to one watch face style. The watch face style is determined in operation 202, and the watch face pattern is further determined according to the watch face style and with reference to the second context information.

The second context information provided in this embodiment of the present invention is used to indicate the dressing information of the user. More specifically, according to the method provided in this embodiment of the present invention, the watch face pattern can be further determined according to the watch face style and the dressing information of the user.

In one embodiment, the watch face pattern corresponding to the watch face style and the dressing information may be presented according to a preset correspondence. The preset correspondence is used to indicate that one combination of the watch face style and the dressing information corresponds to one watch face pattern.

A specific watch face style and specific dressing information are corresponding to one watch face pattern. A correspondence between the specific watch face style, the specific dressing information, and the watch face pattern may be preset and stored in a database. After the watch face style is determined, the watch face pattern may be obtained from the database according to the preset correspondence, the watch face style, and the dressing information that is indicated by the second context information, and presented.

Figure 11B:
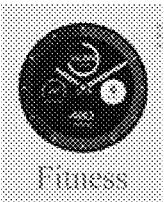
Figure 11B:
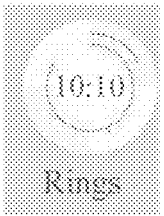
Figure 11B:
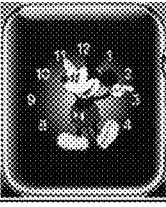
Figure 11C:
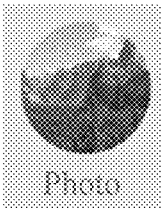
Figure 11C:
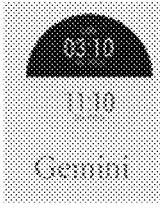
Figure 11C:
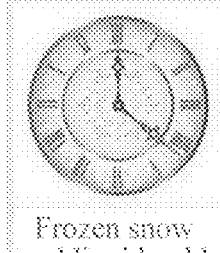

The preset correspondence between the watch face style, the dressing information and the watch face pattern is shown in FIGS. 11A-11C according to one embodiment.

In one embodiment, one combination of the watch face style and the dressing information may alternatively correspond to at least one watch face pattern. A correspondence between the watch face style, the dressing information, and the watch face pattern may be preset, and the correspondence is stored in a database. When the watch face pattern is presented according to the watch face style and the dressing information, the watch face pattern may be displayed to the user according to the correspondence between the watch face style, the dressing information, and the watch face pattern, for the user to select. Finally, a watch face pattern selected by the user is presented.

In one embodiment, the dressing information may further include one or more of a clothes type, a clothes color, a clothes image, or a clothes texture. In one embodiment, the clothes type may include suit, shirt, leather shoes, tie, T-shirt, jeans, sport shoes, and the like; the clothes image may include flower, animal, cartoon image, portrait, character, abstract image, and the like. After the watch face style is determined, the one or more of a clothes type, a clothes color, a clothes image, or a clothes texture may separately correspond to one watch face pattern, and the correspondence may be preset In one embodiment, the watch face style and the dressing information may be combined, and the determined watch face style and the determined dressing information may be combined into one combination. More specifically, the determined watch face style and the determined one or more of a clothes type, a clothes color, a clothes image, or a clothes texture may be combined into one combination. A correspondence between a combination of watch face style and dressing information and a watch face pattern may be preset. More specifically, a correspondence may be preset between a watch face pattern and a combination of watch face style and one or more of a clothes type, a clothes color, a clothes image, or a clothes texture.

In one embodiment, in the preset correspondence, one combination of watch face style and dressing information corresponds to one watch face pattern; more specifically, one combination of watch face style and one or more of a clothes type, a clothes color, a clothes image, or a clothes texture corresponds to one watch face pattern. When a watch face pattern is being presented, the watch face pattern may directly be presented according to the preset correspondence.

In one embodiment, in the preset correspondence, one combination of watch face style and dressing information corresponds to at least one watch face pattern; for example, one combination of watch face style and one or more of a clothes type, a clothes color, a clothes image, or a clothes texture corresponds to at least one watch face pattern. When a watch face pattern is being presented, the at least one watch face pattern may first be displayed to the user according to the preset correspondence, for the user to select, and then, a watch face pattern selected by the user is finally presented.

In one embodiment, the dressing information may further include one or more of upper clothes information, outer wear information, trousers information, shoes and hat information, scarf information, or accessory information. In a watch face style, the one or more of upper clothes information, outer wear information, trousers information, shoes and hat information, scarf information, or accessory information may correspond to a specific watch face pattern. The determined watch face style and determined one or more of upper clothes information, outer wear information, trousers information, shoes and hat information, scarf information, or accessory information may be combined into one combination. A correspondence between a combination of the watch face style and the one or more of upper clothes information, outer wear information, trousers information, shoes and hat information, scarf information, or accessory information and a watch face pattern may be preset.

In one embodiment, in the preset correspondence, one combination of watch face style and one or more of upper clothes information, outer wear information, trousers information, shoes and hat information, scarf information, or accessory information corresponds to one watch face pattern. When a watch face pattern is being presented, the watch face pattern may directly be presented according to the preset correspondence.

In one embodiment, in the preset correspondence, one combination of watch face style and one or more of upper clothes information, outer wear information, trousers information, shoes and hat information, scarf information, or accessory information corresponds to at least one watch face pattern. When a watch face pattern is being presented, the at least one watch face pattern may first be displayed to the user according to the preset correspondence, for the user to select, and then, a watch face pattern selected by the user is finally presented.

After the watch face style is determined, a preset correspondence between the dressing information and the watch face pattern may be shown in Table 4 according to one embodiment.

TABLE 4

Correspondence between clothes information and watch face patterns that match the clothes information

| Clothes information | Watch face pattern | Clothes information | Watch face pattern |
| --- | --- | --- | --- |
| Upper clothes type A1 | Watch face pattern 1 | Trousers type A3 | Watch face pattern 7 |
| Upper clothes type B1 | Watch face pattern 2 | Trousers type B3 | Watch face pattern 8 |

TABLE 4-continued

Correspondence between clothes information and watch face patterns that match the clothes information

| Clothes information | Watch face pattern | Clothes information | Watch face pattern |
|---|---|---|---|
| Upper clothes type C1 | Watch face pattern 3 | Trousers type C3 | Watch face pattern 9 |
| Upper clothes type . . . | Watch face pattern . . . | Trousers type . . . | Watch face pattern . . . |
| Outer wear type A2 | Watch face pattern 4 | Shoes type A4 | Watch face pattern 10 |
| Outer wear type B2 | Watch face pattern 5 | Shoes type B4 | Watch face pattern 11 |
| Outer wear type C2 | Watch face pattern 6 | Shoes type C4 | Watch face pattern 12 |
| Outer wear type . . . | Watch face pattern . . . | Shoes type . . . | Watch face pattern . . . |
|  |  | Dressing type XX | Watch face pattern XX |

In one embodiment, if the dressing information includes a plurality of types of dressing information, and after the watch face style is determined, the plurality of types of dressing information separately correspond to a watch face pattern. According to the method for presenting a watch face provided in an embodiment of the present invention, a plurality of watch face patterns corresponding to the plurality of types of dressing information may be displayed to the user, for the user to select, and a watch face pattern selected by the user is finally presented.

According to the method provided in an embodiment of the present invention, a priority level of the dressing information, such as upper clothes information, outer wear information, trousers information, shoes and hat information, scarf information, or accessory information, may be further set. For example, the priority level of the dressing information may be set as follows: an upper clothes information priority level>an outer wear priority level>a trousers priority level>a shoes and hat priority level>a scarf priority level>a priority level of another accessory (such as earrings, a bracelet, a necklace, or a leather belt). The upper clothes information, the outer wear information, the trousers information, the shoes and hat information, the scarf information, and the accessory information separately correspond to one watch face pattern, and the correspondences may be preset. The watch face pattern corresponding to the determined watch face style and the dressing information may be presented according to the preset correspondences and a sequence of the priority level of the dressing information. For example, a watch face pattern corresponding to the determined watch face style and the upper clothes information, a watch face pattern corresponding to the determined watch face style and the outer wear information, a watch face pattern corresponding to the determined watch face style and the trousers information, a watch face pattern corresponding to the determined watch face style and the shoes and hat information, a watch face pattern corresponding to the determined watch face style and the scarf information, and a watch face pattern corresponding to the determined watch face style and the accessory information may be presented according to a sequence of the foregoing priority levels.

In one embodiment, the watch face pattern corresponding to the watch face style and the dressing information may be displayed to the user according to the priority level of the dressing information and the preset correspondence, for the user to select, and a watch face pattern selected by the user is presented.

In one embodiment, as shown Table 5, correspondences between different dressing information combinations and watch face patterns may be pre-stored in the smartwatch 102. When no watch face pattern that completely matches an obtained dressing information combination is stored, a subset of the obtained dressing information combination may alternatively be searched for in the correspondences. For example, obtained dressing information of the user is upper clothes type A2+trousers type B3+shoes type C4, and no watch face pattern that matches the dressing is stored, but there is a watch face pattern corresponding to a subset, upper clothes type A2+trousers type B3, of the dressing information. Therefore, the watch face pattern 8 may be presented, or the watch face pattern 8 may be recommended to the user as a preferred recommendation pattern, and the watch face pattern 2 corresponding to the upper clothes type A2, the watch face pattern 5 corresponding to the trousers type B3, and the watch face pattern 6 corresponding to the shoes type C4 are sequentially used as secondary recommendations, for the user to select. Then, a watch face pattern selected by the user is presented.

TABLE 5

Correspondence between dressing information/a dressing information combination, and a watch face pattern

| Dressing information/dressing information combination | Watch face pattern |
|---|---|
| Upper clothes type A1 | Watch face pattern 1 |
| Upper clothes type A2 | Watch face pattern 2 |
| Outer wear type A2 | Watch face pattern 3 |
| Trousers type A3 | Watch face pattern 4 |
| Trousers type B3 | Watch face pattern 5 |
| Shoes type C4 | Watch face pattern 6 |
| Upper clothes type A1 + outer wear type A2 | Watch face pattern 7 |
| Upper clothes type A1+ outer wear type A2 + Trousers type B3 | Watch face pattern 7 |
| Upper clothes type A2 + Trousers type B3 | Watch face pattern 8 |

Generally, a clothes color, a clothes image, and a clothes texture may further enable a watch face to be presented more accurately. In one embodiment, if a watch face pattern includes an image similar to a clothes image, the watch face pattern is presented or recommended to the user in priority. As shown by the sequence number 7 in FIG. 11B, the clothes of the user are a cartoon theme image T-shirt, and a watch face pattern presented in priority is a cartoon image. For clothes of different colors, there are watch face patterns of suitable colors that match the clothes. For example, green clothes match a black watch face pattern, red clothes match a white watch face pattern, and blue clothes match a black watch face pattern. When there are a plurality of types of watch face patterns that match a clothes type, a watch face pattern that matches the clothes color may be selected in priority.

According to the method for presenting a watch face provided in an embodiment of the present invention, context information can be obtained, the watch face pattern is determined according to the context information, so that the smartwatch can be flexibly adapted to different scenarios and match a personal style of the user, and a usage range of the smartwatch is widened; in addition, time consumed for selecting a suitable watch face from various watch faces by the user is reduced, and a matching degree between a watch face and a usage scenario is improved.

In one embodiment, before the first context information and the second context information are obtained, the method provided in this embodiment of the present invention further includes: obtaining personal feature information of the user; and determining at least one watch face style and/or at least one watch face pattern according to the personal feature information.

In one embodiment, the personal feature information of the user may include personal information of the user, and may include the user's gender, age, occupation, skin color, figure, personality, and the like. Generally, there is a low probability that the personal information changes; therefore, when using the smartwatch 102 for a first time, the user may set the personal information.

In one embodiment, the personal feature information of the user may include the gender. If the gender of the user is female, watch face styles available for selection include cartoon, sport, simple, fashion, exquisite, noble, elegant, casual, and the like. If the gender of the user is male, watch face styles available for selection include business, cartoon, sport, abstract, simple, fashion, rough, casual, and the like.

In one embodiment, the personal feature information of the user may include the age. If the user is between 10 to 20 years old, watch face styles available for selection include cartoon, fashion, and the like. If the user is between 15 to 25 years old, watch face styles available for selection include fashion, sport, simple, casual, and the like. If the user is between 25 to 35 years old, watch face styles available for selection include business, fashion, sport, abstract, simple, rough, exquisite, elegant, noble, casual, and the like. If the user is between 35 to 45 years old, watch face styles available for selection include business, simple, abstract, sport, fashion, rough, elegant, noble, and the like.

In one embodiment, the personal feature information of the user may include the figure of the user, and the figure may be calculated by inputting height and weight information. If the figure of the user is strong, suitable watch face styles include rough, sport, abstract, and the like. If the figure of the user is lanky, suitable watch face styles include simple, exquisite, casual, elegant, noble, and the like. If the figure of the user is short and small, suitable watch face styles include simple, exquisite, casual, and the like.

In one embodiment, the personal feature information of the user may include the personality. If the user is gentle, suitable watch face styles include exquisite and the like. If the user is straightforward, suitable watch face styles include simple, rough, and the like. If the user is impulsive, suitable watch face styles include abstract and the like. If the user is calm, suitable watch face styles include classic.

In one embodiment, the personal feature information of the user may include the skin color. If the skin color of the user is yellow, suitable watch face colors include pink, blue, red, and the like. If the user is light-complexioned, suitable watch face colors include pink, blue, red, yellow/golden, brown, and the like. If the user is dark-complexioned, suitable watch face colors include blue, black, white/silver, light green, and the like.

In one embodiment, the personal feature information of the user is manually input by the user, so as to ensure information accuracy. The user may set one or more personal information items, and before the watch face style and the watch face pattern are presented according to the first context information and the second context information, the watch face style and/or the watch face pattern may first be presented or selected, in a corresponding range, according to the personal feature information set or input by the user.

In one embodiment, the determining the watch face style according to the first context information includes: further determining, according to the first context information, a watch face style from the at least one watch face style that is determined according to the personal feature information.

In one embodiment, the presenting a watch face pattern according to the watch face style and the second context information includes: determining and presenting, according to the watch face style and the second context information, a watch face pattern from the at least one colored watch face pattern determined according to the personal feature information.

In one embodiment, different personal information of different users of the smartwatch 102, and/or information about watch faces selected by the different users of the smartwatch 102 in different occasions and/or in different dressing may be constantly recorded. When there is a new recommendation requirement, a watch face pattern is presented or recommended according to the recorded information about the watch faces.

In one embodiment, when a watch face pattern is recommended according to the recorded information about the watch faces, one or more of the foregoing conditions may be required, or the first context information or the second context information may not be considered.

In one embodiment, if no condition is considered then a recommendation is performed only according to how many times a watch face pattern is used, for example, if a watch face pattern A is used with highest frequency, the watch face pattern A is presented in priority, or the watch face pattern A is recommended in priority.

In one embodiment, that a watch face pattern B is most frequently selected by a user when the user is in an occasion a may also be determined according to a statistics result. Then, when a current occasion of the user is the occasion a, the watch face pattern B is presented in priority, or the watch face pattern B is recommended in priority.

In one embodiment, that a watch face pattern C is most frequently selected by a user when the user is in dressing b may also be determined according to a statistics result. Then, the watch face pattern C is presented in priority, or the watch face pattern is recommended in priority.

In one embodiment, that a watch face pattern D is most frequently selected by a user when the user is in a usage occasion a and in dressing b may also be determined according to a statistics result. Then, when a user is in the occasion a and in the dressing b, the watch face pattern D is presented in priority, or the watch face pattern D is recommended in priority.

In one embodiment, users corresponding to one or more personal features may also be determined according to a statistics result. A system may classify users who use the smartwatch and collect statistics about frequency with which a watch face pattern is selected by a specific classification of users. For example, if a watch face pattern E favored by 25-year-old office ladies is most frequently selected in this group, when a new user has a similar feature, the watch face pattern E may be presented, or the watch face pattern E may be recommended to the user in priority.

According to the method for presenting a watch face provided in an embodiment of the present invention, the first context information and the second context information can be detected and/or received, the watch face style can be determined according to the first context information, and then, the watch face pattern is presented with reference to the second context information. In this way, a process of automatically presenting the watch face pattern is optimized, a suitability degree between the watch face style, the watch face pattern, and the usage scenario is improved, and time and energy consumed for selecting the watch face pattern by the user are reduced.

An embodiment of the present invention further provides a method for presenting a watch face of a smartwatch. The method is performed by a smartwatch 102, and the method includes: detecting or receiving preference information of a user and a watch face pattern of at least one other user, where the preference information of the user is used to indicate whether the user likes to have a watch face pattern the same as the watch face pattern of the at least one other user, and the at least one other user includes one or more of a social media friend of the user, a social media object followed by the user, or a nearby user; and presenting one of the watch face pattern of the at least one other user according to the preference information of the user.

In an example, the user may be lack of personality and be trend-chasing; or the user wants to express the same taste as someone; or the user likes a watch face pattern of a friend very much, and wants to change a watch face pattern to the same watch face pattern as that of the friend. Therefore, the preference information of the user may be presenting a watch face pattern of a smartwatch of another user.

In an example, the other user may include a friend followed by the user on social media. Specifically, information about the friend that is followed may be obtained from a social media application installed in the smartwatch 102 or an intelligent terminal 101. The friend followed on the social media may be a friend of the user in real life, a star, or a celebrity. When a watch face pattern of a smartwatch used by the friend is obtained, the watch face pattern may be then presented. For a specific example, the user follows a star A on Sina Weibo, and the star A recently uses a watch face pattern Navitimer of a smartwatch. After the smartwatch 102 of the user obtains the watch face pattern of the smartwatch that is recently used by the star A, a presented watch face pattern is the watch face Navitimer.

In one embodiment, according to the method for presenting a watch face provided in this embodiment of the present invention, social media information of the user can be obtained, so that a watch face pattern of a smartwatch worn by a user that is followed by the user is obtained, and the watch face pattern is presented. In an example, a watch face management application is installed in the intelligent terminal 101 or the smartwatch 102, and the watch face management application may authorize the user to log in to using a social media account of the user. The social media account may be a QQ account, a Sina Weibo account, a WeChat account, a cloud account of a manufacturer of the intelligent terminal 101 or the smartwatch 102 (such as an Apple account, a Huawei account, or a Mi account), or the like.

Figure 3:
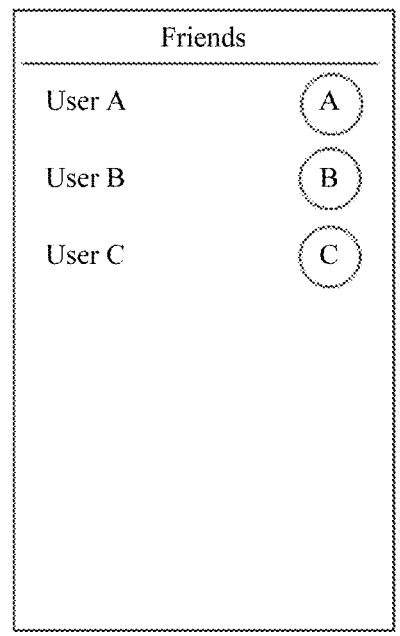
FIG. 3 is a schematic diagram of a friend's watch face pattern obtaining effect according to an embodiment of the present invention.

In one embodiment, on a social media platform, a current user follows users A, B, and C. The users A, B, and C may log in, using social media accounts, to watch face management applications installed in intelligent terminals or smartwatches that are used by the users A, B, and C, and the social media platform may obtain watch face patterns A, B, and C of the smartwatches that are being used by the users A, B, and C. As shown in FIG. 3, when the current user can also log in, using the social media account, to the watch face management application on the intelligent terminal 101 or the smartwatch 102 used by the current user, the watch face management application may obtain the watch face patterns A, B, and C of the smartwatches of the users A B, and C on the social media platform, and recommend the watch face patterns to the current user, for the current user to select and determine, and a selected watch face pattern is displayed on the smartwatch 102 of the current user. In one embodiment, the watch face management application directly sets one of the watch face patterns A, B, and C, for example, the watch face pattern A, to be a determined watch face pattern, and the determined watch face pattern is presented on the smartwatch of the current user.

Figure 4:
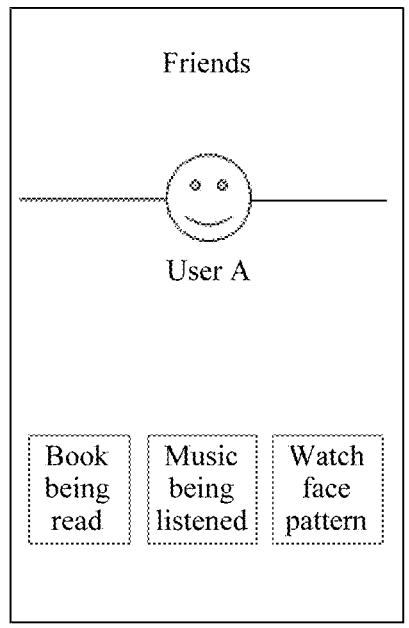
FIG. 4 is a schematic diagram of a friend's watch face pattern obtaining effect according to an embodiment of the present invention.

In one embodiment, as shown in FIG. 4, using the watch face management application on the intelligent terminal 101 or the smartwatch 102 by a current user, basic information of a friend followed by the current user may be displayed, for example, basic information of the user A. The basic information may include an identifier of a watch face pattern of a smartwatch being used by the user A, and the current user may select the identifier of the watch face pattern of the user A. The watch face management application may push a corresponding watch face pattern file to a display interface of the intelligent terminal 101 or the smartwatch 102 of the current user, for the current user to select and determine, and then a selected watch face pattern is displayed on the smartwatch 102 of the current user; or the watch face management application directly sets the watch face pattern of the user A to be a determined watch face pattern, and the determined watch face pattern is presented on the smartwatch 102 of the current user.

In one embodiment, watch face information of a smartwatch of another user in a nearby range may be detected in a short-distance communication manner, such as Bluetooth, Wi-Fi, or NFC. Watch face pattern change is performed according to a detected watch face pattern.

In one embodiment, the foregoing watch face pattern of the smartwatch of another user may be displayed to the user as a candidate watch face pattern, for the user to select. Then, a watch face pattern is determined according to the user' selection, and the determined watch face pattern is presented.

In one embodiment, the preference information of the user may be obtained according to presetting of the user, for example, when the user prefers not to show personality of the user, "present the same watch face as that of a nearby watch" or "present the same watch face as that of a social friend", or another option with a similar connotation may be preset. After obtaining the watch face pattern of a smartwatch of another user, the smartwatch used by the user presents the obtained watch face pattern of the smartwatch of the other user according to context information obtained by the smartwatch used by the user.

Figure 5:
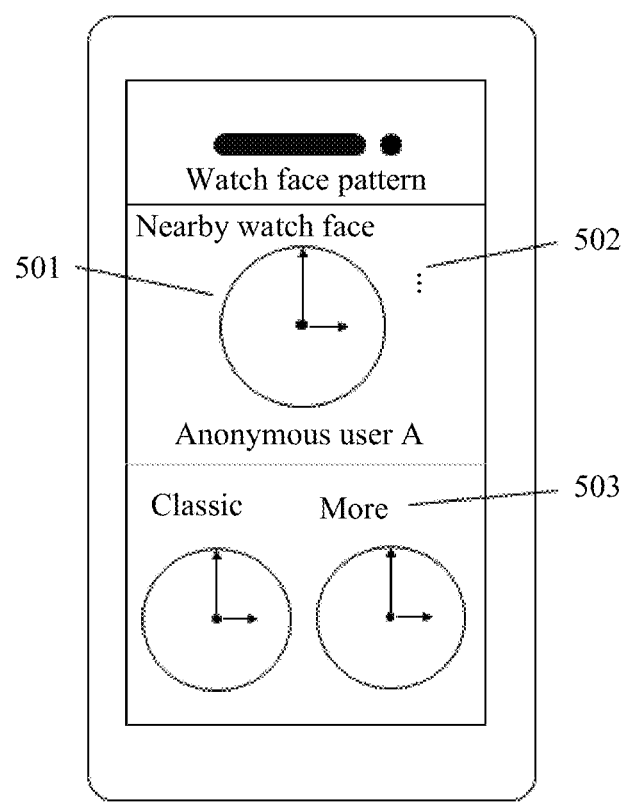
FIG. 5 is a schematic diagram of an effect of a method for presenting a watch face of a smartwatch according to an embodiment of the present invention.

A method for presenting a watch face provided in an embodiment of the present invention is as shown in FIG. 5. The user can see, in a management program of the smartwatch 102, a watch face pattern 501 of a smartwatch used by a nearby anonymous user A. By performing a change operation, for example, using an operation menu 502 in FIG. 5, the user may change a watch face pattern of the user to the watch face pattern 501 of the anonymous user A; or a watch face pattern may be automatically changed to the watch face pattern 501 of the smartwatch of the anonymous user A.

In one embodiment, if the user likes to show personality of the user and expects that a watch face pattern of the user to be different from that of another user. The preference information of the user included in the context information obtained by the smartwatch of the user may be "present a different watch face from that of a nearby watch", or "present a different watch face from that of a social friend", or an option with a similar connotation. Then, the smartwatch avoids, according to the context information, presenting a watch face pattern the same as that of another user.

In one embodiment, the user may simultaneously preset two different types of preference information, and the user changes the preference information at any time when using the smartwatch 102. For example, only a nearby watch face pattern, such as a watch face pattern of a smartwatch of an anonymous user A, is displayed to the user. As shown in FIG. 5, the user may select to change a watch face pattern to the watch face pattern of the smartwatch of the anonymous user A, or select a classic watch face pattern, or the user may click an operation menu item "more" 503 to obtain more watch face patterns, so as to select a watch face pattern different from the watch face pattern of the smartwatch of the anonymous user A.

Figure 6:
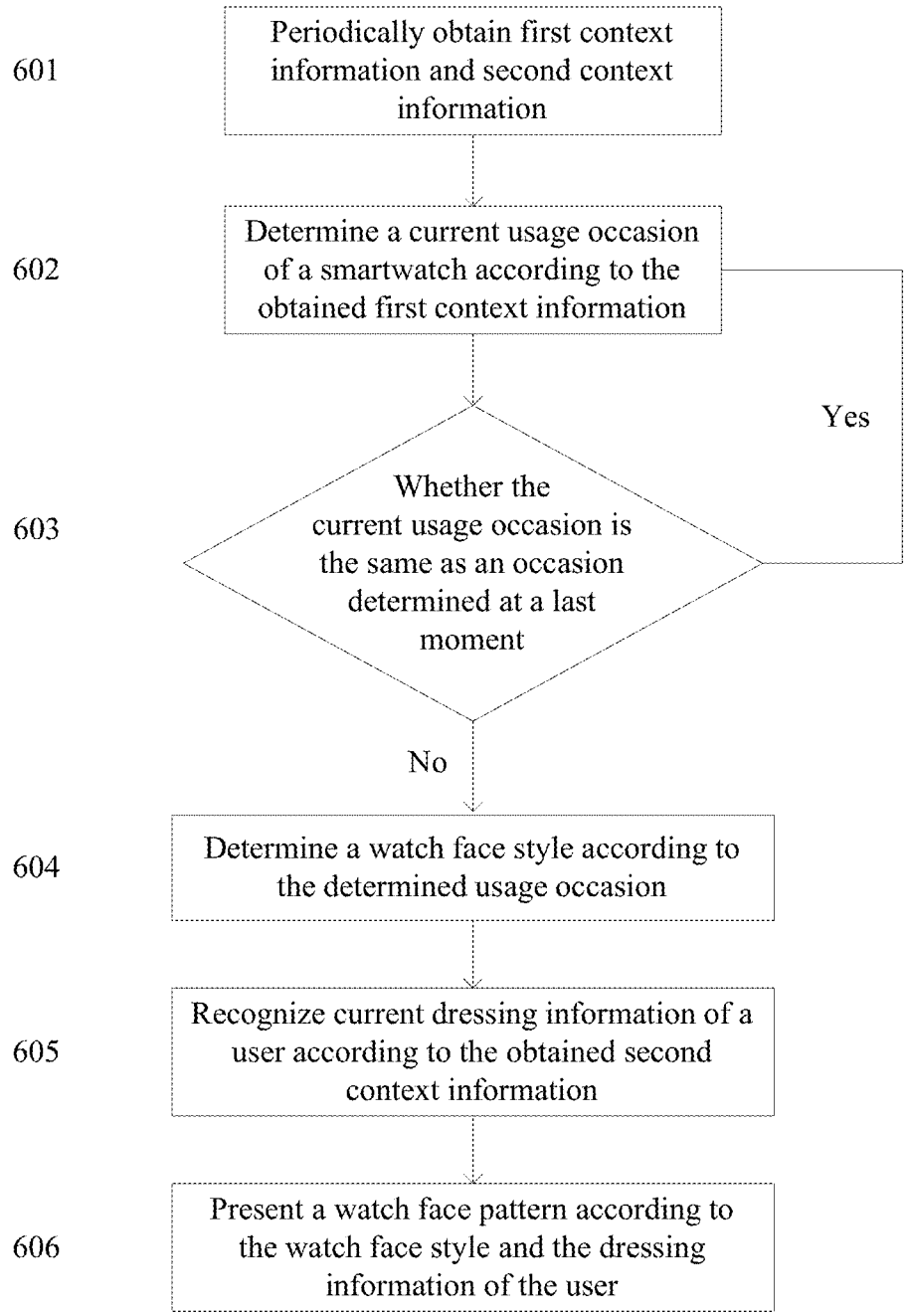
FIG. 6 is a flowchart of a method for presenting a watch face of a smartwatch according to an embodiment of the present invention.

As shown in FIG. 6, in a specific embodiment of the present invention, an example method is described for presenting a watch face of a smartwatch provided in the present invention, and the method is performed by a smartwatch 102.

Operation 601. Periodically obtain first context information and second context information. The smartwatch may periodically obtain, at preset intervals, the first context information and the second context information, including: time, a current user location obtained using a positioning system of an intelligent terminal 101 or the smartwatch 102, a user nearby environment picture and a user dressing picture that are obtained using a camera system of the intelligent terminal 101 or the smartwatch 102, a current user action obtained by a sensor system of the intelligent terminal 101 or the smartwatch 102, and the like.

Operation 602. Determine a current usage occasion, such as work meeting, sports and fitness, birthday party, or casual travel, of the smartwatch according to the first context information obtained in operation 601. The operation may be independently implemented by the smartwatch 102, or may be implemented by the smartwatch 102 and an intelligent terminal 101 connected to the smartwatch 102. Specifically, the usage occasion may be determined in a simple-rule matching manner, or more intelligently, may be determined using the machine learning algorithm, for example, one occasion model M is established for each usage occasion A using a quantity of training data sets that include the first context information and a label of the current usage occasion, and when a group of first context information S is obtained, S is input to the model M, and output of M is a determining result of whether the current usage occasion is the usage occasion A. Further, a system can learn of and update the occasion model using the context information and occasion label information that are constantly obtained, so that a usage occasion recognition accuracy rate is improved.

Operation 603. Determine whether the current usage occasion determined in operation 602 is the same as a usage occasion determined at a last moment. If the current usage occasion determined in operation 602 is the same as the usage occasion determined at the last moment, that is, if the currently recognized usage occasion does not vary from the usage occasion recognized at the last moment, a subsequent watch face pattern change operation does not need to be performed and operation 601 continues to be performed to periodically obtain the first context information and the second context information; otherwise, operation 604 is performed.

Operation 604. Determine a watch face style according to the determined current usage occasion.

Operation 605. Recognize current dressing information of a user according to the obtained second context information, such as a user dressing picture.

Operation 606. Present a watch face pattern according to the watch face style and the dressing information of the user.

According to the method for presenting a watch face provided in an embodiment of the present invention, a watch face that is suitable for a current scenario can be automatically presented according to current feature information of the user, so that a time consumed for selecting a watch face by the user is reduced and a suitability degree between the watch face and the current scenario is improved.

In another embodiment of the present invention, a 35-year-old office lady at work is used as an example for describing the method for presenting a watch face of a smartwatch provided in an embodiment of the present invention in detail.

When initially setting a watch, a user inputs personal information, for example, gender: female, age: 35, height: 160 cm, weight: 55 kg, and occupation: company employee.

Because the gender of the user is female, watch face styles available for selection include cartoon, sport, simple, fashion, exquisite, noble, elegant, casual, and the like.

Because the user is between 25 to 35 years old, watch face styles available for selection include business, fashion, sport, abstract, simple, rough, exquisite, elegant, noble, casual, and the like.

Because the user is lanky in figure, watch face styles available for selection include simple, exquisite, casual, elegant, noble, and the like.

Because the occupation of the user is company employee, watch face styles available for selection include business, cartoon, sport, abstract, simple, fashion, rough, exquisite, elegant, casual, and the like.

When the personal information input by the user is taken into account as a whole, watch face styles that are suitable for the user include simple, exquisite, casual, and elegant.

Current location information of the user, obtained by a positioning system of the smartwatch 102 or the intelligent terminal 101 is company, and current time is 9:00 a.m.; then, a current usage occasion of the user is recognized as at daily work, and watch face styles corresponding to a daily work occasion are business and simple. According to the watch face styles determined according to the personal feature information input by the user and usage occasion information as a whole, simple is determined as a watch face style that is currently suitable for the user most.

The user takes a selfie using a camera of the smartwatch 102 or the intelligent terminal 101, and a blue dress and silk stockings (refer to sequence number 3 in FIG. 11A) is recognized as current dressing of the user, and a black watch face pattern is determined as a watch face pattern that is currently suitable for the user most.

Finally, three black watch face patterns A, B, and C in simple styles are sifted out and displayed to the user, for the user to select. The user selects the watch face pattern B from the three watch face patterns, and the watch face pattern changes to be the pattern B. If it is recorded that the user once selects the watch face pattern A for a plurality of times, it may be considered that the watch face pattern A is preferred by the user, and therefore, a system may display the watch face pattern A as a default recommended watch face pattern to the user in priority, for the user to select; or the watch face pattern A may be directly determined and presented.

According to the method for presenting a watch face of a smartwatch provided in an embodiment of the present invention, a watch face that is suitable for a current scenario can be automatically presented according to the personal feature information of the user and current feature information, so that a time consumed for selecting a watch face by the user is reduced and a suitability degree between the watch face, the current scenario, and a personal feature is improved.

Figure 7:
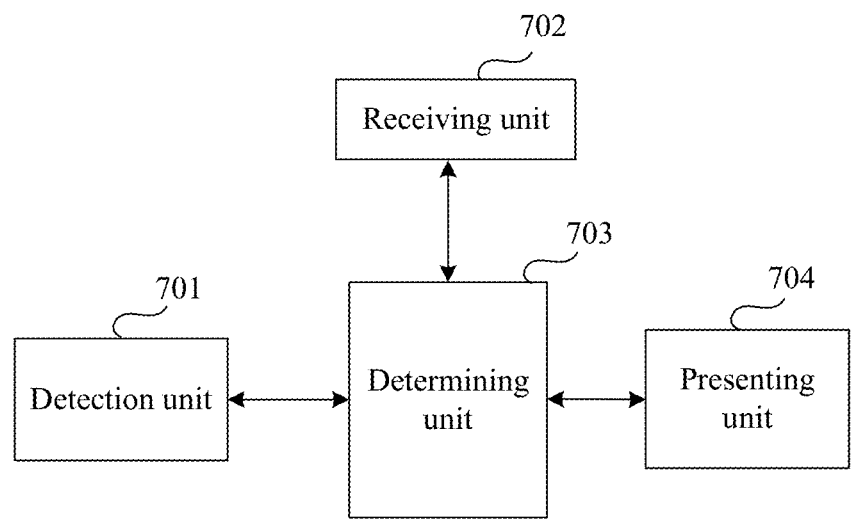
FIG. 7 is a schematic diagram of an apparatus for presenting a watch face of a smartwatch according to an embodiment of the present invention.

An embodiment of the present invention provides an apparatus for presenting a watch face of a smartwatch, configured to perform the method for presenting a watch face that is provided in the embodiments of the present invention and described in the foregoing content. As shown in FIG. 7, the apparatus includes: a detection unit 701 and/or a receiving unit 702, configured to detect and/or receive first context information and second context information, where the first context information is used to determine a watch face style of the smartwatch, and the second context information is used to indicate dressing information of a user; a determining unit 703, configured to determine the watch face style of the smartwatch according to the first context information that is detected by the detection unit 701 and/or received by the receiving unit 702; and a presenting unit 704, configured to present a watch face pattern of the smartwatch according to the watch face style, of the smartwatch, determined by the determining unit and the second context information that is detected by the detection unit and/or received by the receiving unit.

For another function of the functional units of the apparatus, reference may be made to related descriptions of the method for presenting a watch face in the foregoing content. Details are not repeated herein.

According to one embodiment, a watch face that is suitable for a current scenario can be automatically presented according to personal feature information of the user and current feature information, so that time consumed for selecting a watch face by the user is reduced and a suitability degree between the watch face, the current scenario, and a personal feature is improved.

According to one embodiment, the first context information and the second context information can be detected and/or received, the watch face style can be determined according to the first context information, and then, the watch face pattern is presented with reference to the second context information. In this way, a process of automatically presenting the watch face pattern is optimized, a suitability degree between the watch face style, the watch face pattern, and a usage scenario is improved, and time and energy consumed for selecting the watch face pattern by the user are reduced.

Figure 8:
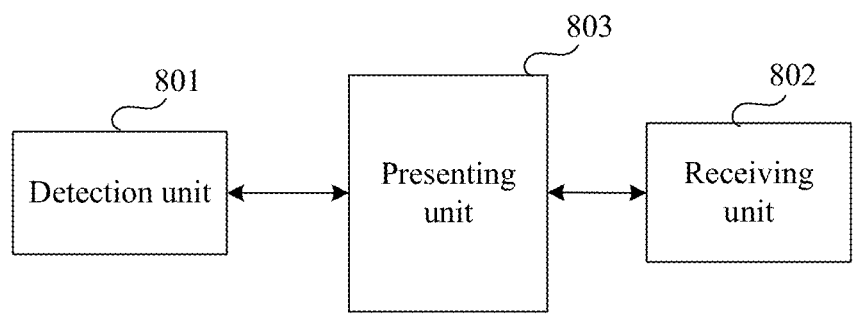
FIG. 8 is a schematic diagram of an apparatus for presenting a watch face of a smartwatch according to an embodiment of the present invention.

An embodiment of the present invention includes an apparatus for presenting a watch face of a smartwatch, configured to perform a method for presenting a watch face that is provided in the embodiments of the present invention and described in the foregoing content. As shown in FIG. 8, the apparatus includes: a detection unit 801 and/or a receiving unit 802, configured to detect or receive preference information of a user and a watch face pattern of at least one other user, where the preference information of the user is used to indicate whether the user likes to have a watch face pattern the same as the watch face pattern of the at least one other user, and the at least one other user includes one or more of a social media friend of the user, a social media object followed by the user, or a nearby user; and a presenting unit 803, configured to present one of the watch face pattern of the at least one other user according to the preference information of the user.

For beneficial effects of the apparatus, reference may be made to the beneficial effects brought by the foregoing methods. Repeated content is not described again.

Figure 9:
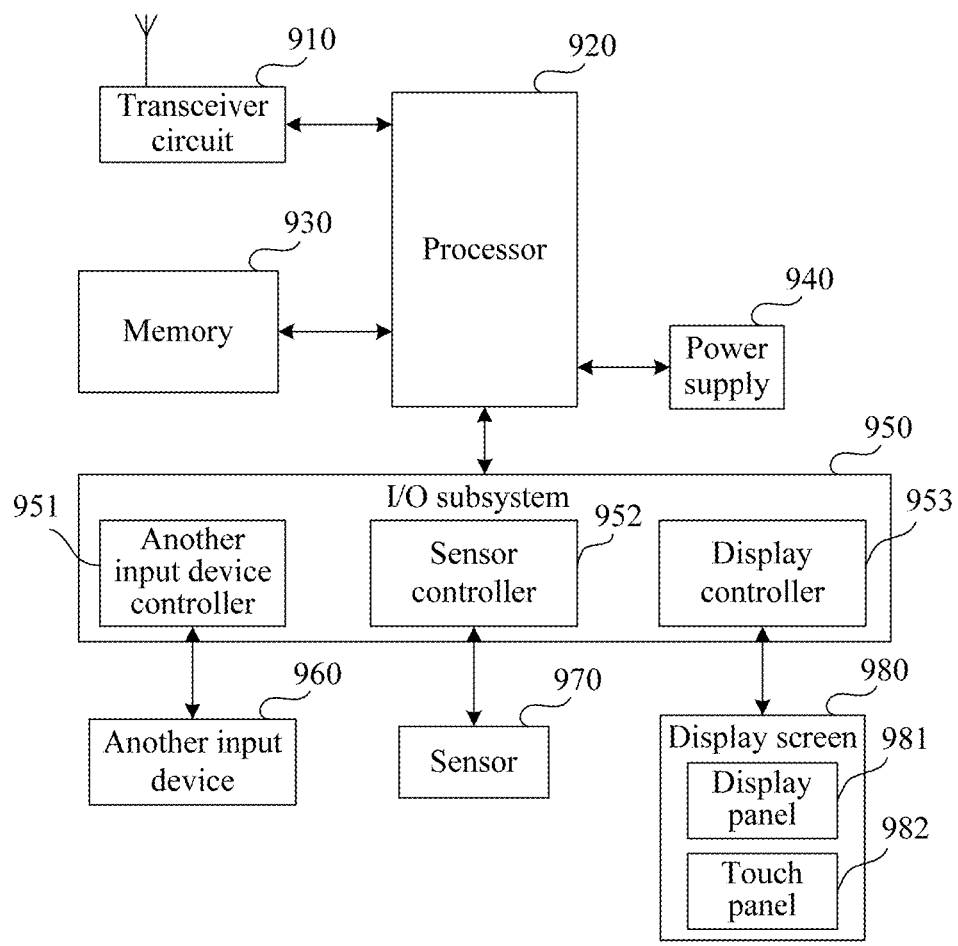
FIG. 9 is a schematic structural diagram of a smartwatch according to an embodiment of the present invention.

An embodiment of the present invention further provides a smartwatch, configured to implement the foregoing method for presenting a watch face of a smartwatch provided in the embodiments of the present invention, as shown in FIG. 9.

FIG. 9 is a block diagram of a partial structure of the smartwatch, related to this embodiment of the present invention. The smartwatch includes parts such as a transceiver circuit 910, a memory 930, another input device 960, a display screen 980, a sensor 970, an I/O subsystem 950, a processor 920, and a power supply 940. The another input device 960 may further include a user voice input apparatus, a user operation input apparatus, and the like. The sensor 970 may further include a positioning apparatus, a camera apparatus, an action sensor apparatus, and the like.

A person skilled in the art may understand that, the smartwatch structure shown in FIG. 9 does not constitute a limitation on the smartwatch, and the smartwatch may include more or less parts than those shown in the figure, or a combination of some parts, or a division of some parts, or parts disposed differently.

The transceiver circuit 910 may be configured to receive first context information and second context information; the another input device 960 and the sensor 970 may be configured to detect the first context information and the second context information. The first context information is used to determine a watch face style of the smartwatch, and the second context information is used to indicate dressing information of a user. The processor 920 may be further configured to determine the watch face style of the smartwatch according to the first context information, and enable, according to the watch face style and the second context information, the display screen 980 to present a watch face pattern of the smartwatch.

Figure 10:
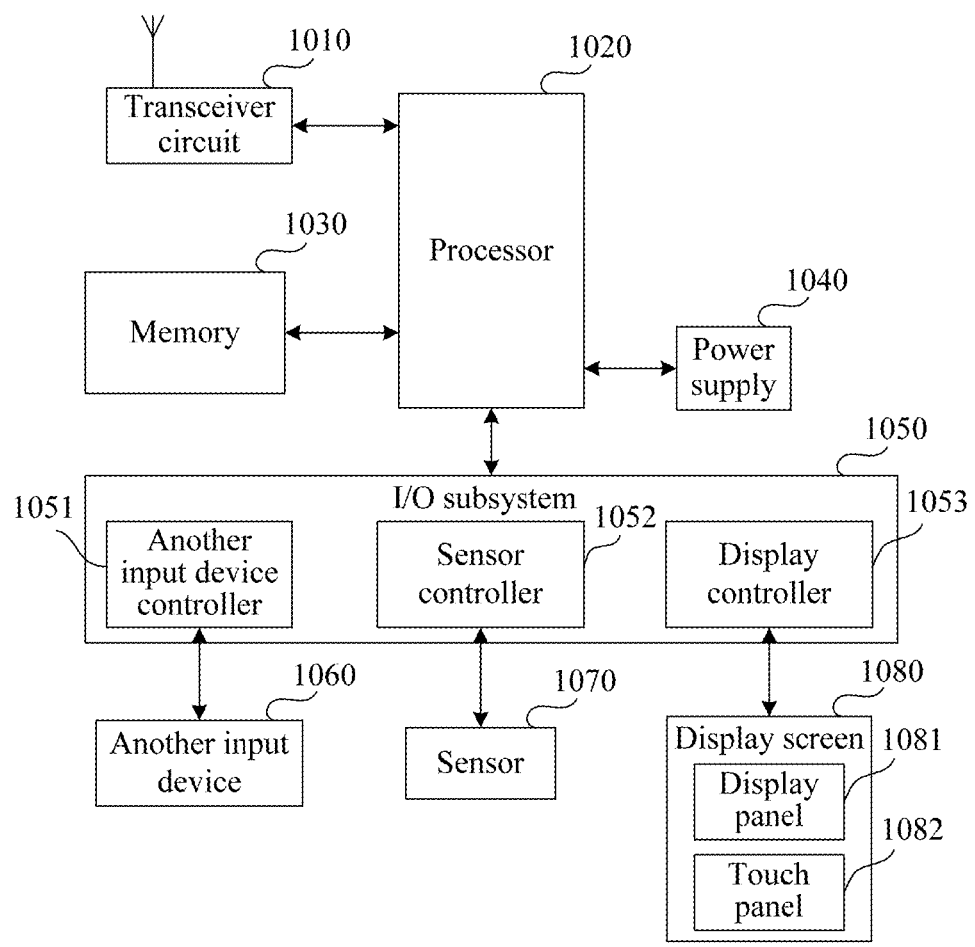
FIG. 10 is a schematic structural diagram of a smartwatch according to an embodiment of the present invention.

An embodiment of the present invention provides a smartwatch, configured to implement a method for presenting a watch face of a smartwatch provided in the embodiments of the present invention, as shown in FIG. 10.

FIG. 10 is a block diagram of a partial structure of the smartwatch, related to this embodiment of the present invention. The smartwatch includes parts such as a transceiver circuit 1010, a memory 1030, another input device 1060, a display screen 1080, a sensor 1070, an I/O subsystem 1050, a processor 1020, and a power supply 1040. The another input device 1060 may further include a user voice input apparatus, a user operation input apparatus, and the like. The sensor 1070 may further include a positioning apparatus, a camera apparatus, and the like.

A person skilled in the art may understand that, the smartwatch structure shown in FIG. 10 does not constitute a limitation on the smartwatch, and the smartwatch may include more or less parts than those shown in the figure, or a combination of some parts, or a division of some parts, or parts disposed differently.

The transceiver circuit 1010 may be configured to receive preference information of a user and a watch face pattern of at least one other user; the another input device 1060 and the sensor 1070 may be configured to detect preference information of a user and a watch face pattern of the at least one other user. The preference information of the user is used to indicate whether the user likes to have a watch face pattern the same as the watch face pattern of the at least one other user, and the at least one other user includes one or more of a social media friend of the user, a social media object followed by the user, or a nearby user. The display screen 1080 may be configured to present one of the watch face pattern of the at least one other user according to the preference information of the user.

A person skilled in the art may be further aware that, in combination with the examples described in the embodiments disclosed in this specification, units and algorithm operations can be implemented using electronic hardware, computer software, or a combination thereof. To clearly describe the interchangeability between the hardware and the software, the foregoing has generally described compositions and operations of each example according to functions. Whether the functions are performed using hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or a part of the operations in each of the foregoing method of the embodiments may be implemented by a program instructing a processor. The foregoing program may be stored in a computer readable storage medium. The storage medium may be a non-transitory (non-transitory) medium, such as a random-access memory, read-only memory, a flash memory, a hard disk, a solid state drive, a magnetic tape (magnetic tape), a floppy disk (floppy disk), an optical disc (optical disc), or any combination thereof.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the principle of the present invention should fall within the protection scope of the present invention.

What is claimed is:

1. A method for presenting a watch face of a smartwatch, comprising:
    obtaining personal feature information of a user, first context information and second context information, wherein the personal feature information includes a figure of the user calculated by inputting height and weight information, wherein the first context information is used to determine a watch face style of the smartwatch, and the second context information is used to indicate dressing information of the user;
    determining the watch face style of the smartwatch according to the first context information and the personal feature information of the user; and
    presenting a watch face pattern of the smartwatch according to the watch face style and the second context information.

2. The method according to claim 1, wherein the first context information comprises one or more location information of the user, current time information, action information, agenda information, voice information, social media information, or operation instruction information of the user; and
    determining the watch face style of the smartwatch according to the first context information comprises:
    determining a usage occasion of the user according to the first context information, and
    determining the watch face style of the smartwatch according to the usage occasion.

3. The method according to claim 1, wherein presenting the watch face pattern of the smartwatch according to the watch face style and the second context information comprises:
    presenting, according to a preset correspondence, the watch face pattern corresponding to the watch face style and the dressing information, wherein the preset correspondence is used to indicate one combination of the watch face style and the dressing information corresponds to one watch face pattern.

4. The method according to claim 3, wherein the dressing information comprises one or more upper clothes information, outer wear information, trousers information, shoes and hat information, scarf information, or accessory information.

5. The method according to claim 4, wherein before presenting, according to the preset correspondence, the watch face pattern corresponding to the watch face style and the dressing information, the method further comprises:
    setting a priority level of the one or more of upper clothes information, outer wear information, trousers information, shoes and hat information, scarf information, or accessory information; and
    presenting, according to the preset correspondence, the watch face pattern corresponding to the watch face style and the dressing information comprises:
    presenting, according to the preset correspondence and a sequence of the priority level, the watch face pattern corresponding to the watch face style and the dressing information.

6. The method according to claim 1, wherein presenting the watch face pattern of the smartwatch according to the watch face style and the second context information comprises:
    displaying, according to a preset correspondence, a watch face pattern corresponding to the watch face style and the dressing information to the user, for the user to select, wherein the preset correspondence is used to indicate one combination of the watch face style and the dressing information corresponds to at least one watch face pattern; and
    presenting a watch face pattern selected by the user.

7. The method according to claim 1, wherein determining the at least one watch face style of the smartwatch according to the first context information comprises:
    determining, according to the first context information, the watch face style of the smartwatch from the at least one watch face style of the smartwatch according to the personal feature information of the user.

8. The method according to claim 1, wherein the method further comprises:
    obtaining preference information of the user and a watch face pattern of at least one other user, wherein the preference information of the user is used to indicate whether the user likes to have a watch face pattern the same as the watch face pattern of the at least one other user, and the at least one other user comprises one or more of a social media friend of the user, a social media object followed by the user, or a nearby user; and presenting one of the watch face pattern of the at least one other user according to the preference information of the user.

9. The method according to claim 8, wherein presenting one of the watch face pattern of the at least one other user according to the preference information of the user comprises:
displaying the watch face pattern of the at least one other user to the user according to the preference information of the user, for the user to select; and
presenting a watch face pattern selected by the user.

10. An apparatus for presenting a watch face of a smartwatch, wherein the apparatus comprising:
at least one processor; and
a non-transitory computer-readable storage medium coupled to the at least one processor and storing programming instructions for execution by the at least one processor, the programming instructions instruct the at least one processor to perform the following operations:
obtaining personal feature information of a user, first context information and second context information, wherein the personal feature information includes a figure of the user calculated by inputting height and weight information, wherein the first context information is used to determine a watch face style of the smartwatch, and the second context information is used to indicate dressing information of the user;
determining the watch face style of the smartwatch according to the first context information and the personal feature information of the user; and
presenting a watch face pattern of the smartwatch according to the watch face style and the second context information.

11. The apparatus according to claim 10, wherein the first context information comprises one or more location information of the user, current time information, action information, agenda information, voice information, social media information, or operation instruction information of the user; and
the programming instructions further instruct the at least one processor to perform the following operations:
determining a usage occasion of the user according to the first context information, and
determining the watch face style of the smartwatch according to the usage occasion.

12. The apparatus according to claim 10, wherein the programming instructions further instruct the at least one processor to perform the following operations:
presenting, according to a preset correspondence, a watch face pattern corresponding to the watch face style and the dressing information, wherein the preset correspondence is used to indicate one combination of the watch face style and the dressing information corresponds to one watch face pattern.

13. The apparatus according to claim 12, wherein the dressing information comprises:
one or more upper clothes information, outer wear information, trousers information, shoes and hat information, scarf information, or accessory information.

14. The apparatus according to claim 13, wherein the programming instructions further instruct the at least one processor to perform the following operations:
setting a priority level of the one or more upper clothes information, outer wear information, trousers information, shoes and hat information, scarf information, or accessory information; and presenting, according to the preset correspondence and a sequence of the priority level, the watch face pattern corresponding to the watch face style and the dressing information.

15. The apparatus according to claim 10, wherein the programming instructions further instruct the at least one processor to perform the following operations:
displaying, according to a preset correspondence, a watch face pattern corresponding to the watch face style and the dressing information to the user, for the user to select, wherein the preset correspondence is used to indicate one combination of the watch face style and the dressing information corresponds to at least one watch face pattern; and
presenting a watch face pattern selected by the user.

16. The apparatus according to claim 10, wherein the programming instructions further instruct the at least one processor to perform the following operations:
determining, according to the first context information the watch face style of the smartwatch from the at least one watch face style.

17. An apparatus according to claim 10, wherein the programming instructions further instruct the at least one processor to perform the following operations:
obtaining preference information of a user and a watch face pattern of at least one other user, wherein the preference information of the user is used to indicate whether the user likes to have a watch face pattern the same as the watch face pattern of the at least one other user, and the at least one other user comprises one or more of a social media friend of the user, a social media object followed by the user, or a nearby user; and
presenting, according to the preference information of the user, one of the watch face pattern of the at least one other user.

18. The apparatus according to claim 17, wherein the programming instructions further instruct the at least one processor to perform the following operations:
displaying the watch face pattern of the at least one other user to the user according to the preference information of the user, for the user to select; and
presenting a watch face pattern selected by the user.

19. A non-transitory computer-readable medium for storing instructions, which when executed by a processor, cause the processor to perform a method, the method comprising:
obtaining personal feature information of a user, first context information and second context information, wherein the personal feature information includes a figure of the user calculated by inputting height and weight information, wherein the first context information is used to determine a watch face style of the smartwatch, and the second context information is used to indicate dressing information of the user;
determining the watch face style of the smartwatch according to the first context information and the personal feature information of the user; and
presenting a watch face pattern of the smartwatch according to the watch face style and the second context information.

20. The non-transitory computer-readable medium of claim 19, wherein the first context information comprises one or more location information of the user, current time information, action information, agenda information, voice information, social media information, or operation instruction information of the user; and
the programming instructions further instruct the at least one processor to perform the following operations:

determining a usage occasion of the user according to the first context information, and determining the watch face style of the smartwatch according to the usage occasion.

* * * * *